United States Patent [19]

Kallenberger

[11] Patent Number: 5,384,950
[45] Date of Patent: Jan. 31, 1995

[54] METHOD FOR MACHINING A COMPONENT

[75] Inventor: Harvey J. Kallenberger, Wind Lake, Wis.

[73] Assignee: Harnischfeger Corporation, Brookfield, Wis.

[21] Appl. No.: 241,553

[22] Filed: May 12, 1994

[51] Int. Cl.⁶ .................. B23F 1/00; B23D 15/00; B23C 1/00
[52] U.S. Cl. ...................... 29/558; 364/474.01; 409/2; 409/51; 409/61; 409/131
[58] Field of Search .............. 409/131, 132, 80, 51, 409/2, 61, 1, 293, 244, 558; 318/568, 569; 364/474.25, 474.26, 474.06, 474.34, 474.35, 474.01; 51/165.71, 287; 29/558, 557, 33 R

[56] References Cited

U.S. PATENT DOCUMENTS

| 144,214 | 11/1873 | Mills ........................ 409/61 |
| 2,962,937 | 12/1960 | Crise et al. ................ 90/9 |
| 3,368,455 | 2/1968 | Ellwanger ................... 90/1 |
| 3,520,227 | 7/1970 | Hunkeler et al. ............ 90/1 |
| 3,521,524 | 7/1970 | Hunkeler et al. ............ 90/1 |
| 3,555,961 | 1/1971 | Vitushkin ................... 90/1 |
| 3,633,011 | 1/1972 | Bederman ................... 364/474.34 |
| 3,863,402 | 2/1975 | Price ....................... 51/216 ND |
| 4,364,110 | 12/1982 | Hyatt ....................... 364/474.26 X |
| 4,382,215 | 5/1983 | Barlowel ................... 318/568 |
| 4,512,694 | 4/1985 | Foran et al. ............... 409/12 |
| 4,542,467 | 9/1985 | McMurtry ................... 364/474.03 X |
| 4,591,771 | 5/1986 | Nozana et al. .............. 318/569 |
| 4,945,501 | 7/1990 | Bell ........................ 364/474.35 X |
| 5,016,199 | 5/1991 | McMurtry ................... 364/474.03 X |
| 5,091,861 | 2/1992 | Geller ...................... 364/474.34 |
| 5,208,763 | 5/1993 | Hong et al. ................ 364/474.36 |
| 5,220,510 | 6/1993 | Araki ....................... 364/474.36 |
| 5,339,249 | 8/1994 | Schaeffer .................. 364/474.18 |

FOREIGN PATENT DOCUMENTS

| 2528745 | 12/1983 | France ........................ 409/80 |
| 287150 | 2/1991 | German Dem. Rep. ............. 409/2 |
| 1163637 | 2/1964 | Germany . |
| 2817898 | 10/1979 | Germany ....................... 364/474.34 |
| 3201851 | 8/1983 | Germany ....................... 409/80 |
| 3408173 | 9/1985 | Germany ....................... 364/474.35 |
| 172005 | 9/1984 | Japan .......................... 364/474.34 |
| 60-56812 | 4/1985 | Japan . |
| 55710 | 3/1986 | Japan .......................... 364/474.34 |
| 15063 | 1/1987 | Japan .......................... 409/2 |
| 35909 | 2/1987 | Japan .......................... 364/474.34 |
| 113206 | 5/1987 | Japan .......................... 364/474.35 |
| 62-178842 | 11/1987 | Japan . |
| 281845 | 11/1989 | Japan .......................... 364/474.01 |
| 41872 | 2/1990 | Japan .......................... 51/165.71 |
| 4025346 | 1/1992 | Japan .......................... 409/61 |
| 4801908 | 3/1992 | Japan .......................... 364/474.01 |
| 2155661 | 9/1985 | United Kingdom ................ 409/80 |
| 563235 | 6/1977 | U.S.S.R. ....................... 409/51 |

Primary Examiner—William Briggs
Attorney, Agent, or Firm—Jansson & Shupe, Ltd.

[57] ABSTRACT

Disclosed is a method for machining a component using a CNC or an NC machine. The method includes the steps of mounting the component at a location on the machine and providing a pair of datum points, e.g., "locating holes" or dowels, on the component. A first base line is defined to extend through the datum points and a second base line is defined to intersect the first base line at an intersection. While retaining the component at its mounting location, such component is machined using dimensions measured from the base line intersection. The new method avoids the inaccuracies, e.g., tolerances and tolerance "buildup," that often results from the use of jigs, fixtures and the like. In other words, the component itself becomes the reference for machining. The method is particularly useful in making parts such as detachable, unevenly-wearing gear segments which can be turned end-for-end for greatly improved service life.

10 Claims, 3 Drawing Sheets

METHOD FOR MACHINING A COMPONENT

FIELD OF THE INVENTION

This invention relates generally to material shaping and, more particularly, to component machining, preferably using a computerized numerically controlled (CNC) or numerically controlled (NC) machine tool.

BACKGROUND OF THE INVENTION

Most components used in finished goods undergo some sort of shape transformation prior to such use. As an extreme example, some components are injection molded of plastic and are ready (or virtually ready) to use at the completion of molding. Their shape is thus "transformed" from plastic granules to the finished part with very little or no final machining.

On the other hand, many other types of components require finish machining to place them in condition for use in finished goods. And that is true irrespective of whether the partially-completed component is brought to its "intermediate" form by casting, by fabrication or by some other means.

U.S. Pat. Nos. 144,214 (Mills) and 2,962,937 (Crise et al.) and German Patent 1 163 637 all relate to machining components from an intermediate to a finished (or more nearly finished) form. The Mills and German patents relate to gear machining and the arrangements described in those two patents involve using a "machine-based" device as a dimensional reference.

For example, the device shown in the German patent rotationally positions a gear by engaging it with a spring loaded feeler pin which is mounted on the machine used to cut the gear. In the attachment shown in the Mills patent, gear blanks are indexed for cutting gear teeth therein by engaging the point of a thumb screw with an index disk. The point engages a separate depression in the disk for each tooth to be cut. The index disk and the point are both mounted on the machine used for shaping the gear.

The method depicted in the Crise et al. patent is used to make cams and involves drawing a scribe line through the cam blank axis of rotation. Angles between each of several radials and the scribe line are used to calculate each of several tangents. A flat cut is then made at each tangent and, according to the patent, a curved cam surface results. Presumably, this requires a relatively large number of very closely spaced flat cuts to approximate a curved surface.

U.S. Pat. No. 4,512,694 (Foran et al.) involves a method and apparatus for aligning gears. After gear teeth are cut, a fixture with a radial arm and a head shaped like a truncated cone "picks up" a location from the teeth and uses such location to locate a keyway to be cut in the gear hub. While such fixture is gear, rather than machine, mounted, the accuracy with which the keyway is cut depends upon the accuracy of the fixture itself and upon its cone-shaped head part.

Similarly, the approach depicted in the Mills patent relies for its accuracy upon the accuracy with which the depressions are formed in an index disk and the accuracy with which the thumb-screw adjusted point is made. And it should be appreciated that all of the dimensional tolerances of the Foran et al. fixture, the Mills index disk and adjusted point are additive to the tolerances of the positioning accuracy of the cutting head (or other machining head) used by the machine tool to do the actual machining. The Crise et al. patent indicates the depicted method is for cutting radial type cams and gears that have irregular or non-circular profiles.

A new method for machining a component which addresses some of the problems and shortcomings of the prior art would be an important advance.

OBJECTS OF THE INVENTION

It is an object of the invention to provide a new method for machining a component which overcomes some of the problems and shortcomings of the prior art.

Another object of the invention is to provide a method for machining a component which is highly suited for use with a computerized numerically controlled machine tool or with a numerically controlled machine tool.

Another object of the invention is to provide a method for machining a component which relies for its accuracy almost solely upon the positioning accuracy of the machining head of the tool used to perform such machining.

Still another object of the invention is to provide a method for machining a component which, for certain kinds of components, eliminates the need for jigs, fixtures and the like. How these and other objects are accomplished will become more apparent from the following descriptions and from the drawing.

SUMMARY OF THE INVENTION

The invention involves a new method for machining a component, preferably using a computerized numerically controlled machine or numerically controlled machine. The new method "references" finished component dimensions to the component itself rather than to a separate jig, fixture, or setup gauge of some sort.

The method includes the steps of mounting the component at a location on the machine such as atop a bed specifically provided to support the component work piece. A pair of spaced datum points, e.g., small diameter holes or pins, are provided on the component and a first base line is defined and extends through the datum points.

A second base line is then defined to intersect the first base line at a junction or intersection. Preferably, the second base line is perpendicular to the first base line and is at known distance(s) from the datum points or, in the alternative, extends through one or the other datum point. While retaining the component clamped at the same location on the machine as such component occupied when the base lines were defined, such component is machined using dimensions measured from the base line intersection.

A specific example involves a component which is elongate and has a pair of ends. An exemplary arc-like gear segment is described. For a component of that type, each datum point is adjacent to a separate end of the component so that the datum points are as far apart as reasonably possible. Accuracy of machining will thereby be improved. And it is to be appreciated that the arc-like segment may be that of a large thrust bearing, for example. It need not be a gear segment.

Considering further the exemplary arc-like gear segment, the machining step includes machining the component to be symmetrical about a plane between the datum points and generally normal to the first base line. More specifically, the plane is exactly midway between such datum points. Machining for such symmetry provides a gear segment which may be "flipped" end for end. The reason such symmetry is desirable in certain applications is explained in the detailed description.

In another aspect of the method, the machining step includes machining a generally planar face on each end of the gear segment. Each face is spaced from its adjacent datum point and where one or both of the datum points are holes as mentioned above, the axial center line of each hole is spaced from its adjacent end by a dimension. The machining step is carried out so that the end-to-hole dimensions are equal to one another and so that the faces are at corresponding angles to a base line.

In another aspect of the inventive method, the mounting step includes mounting the component on a generally planar machine surface and the machining step includes machining component surfaces which are generally normal to such machine surface. Using the gear segment as the exemplary component, the component surfaces comprise gear teeth on the segment. The machining step may also include machining at least one aperture in the segment which is later used to attach the segment to the gear hub.

In yet another aspect of the method, the defining step includes forming a pair of datum points on the component. Such datum points may be round holes in the component or dowel pins extending from the component. Round holes or pins are preferred since each has a precisely-defined center axis through which the first base line extends. Location of such base line is thereby made more precise.

In practicing the method, it is found to be most convenient if the second base line is arranged perpendicular to the first base line. It is also most convenient if the base line intersection is coincident with a datum point. In that way, the first base line and the second base line represent "X" and "Y" axes, respectively, and machining dimensions are conveniently measured parallel to each base line.

DETAILED DESCRIPTIONS OF PREFERRED EMBODIMENTS

Figure 1:
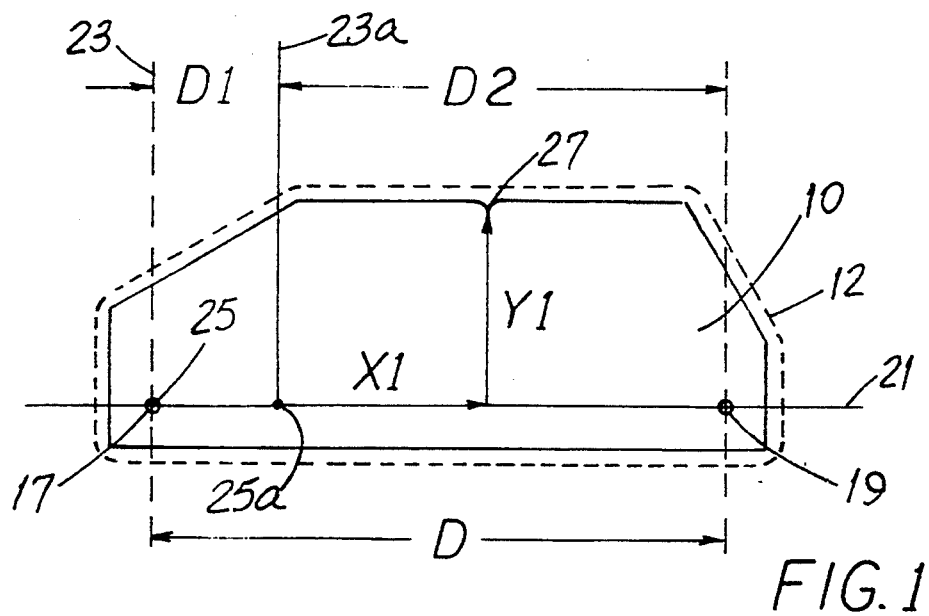
FIG. 1 is a top plan view of an exemplary finish-machined component, shown in solid outline, made from a blank, shown in dashed outline, using the new method.
Figure 2:
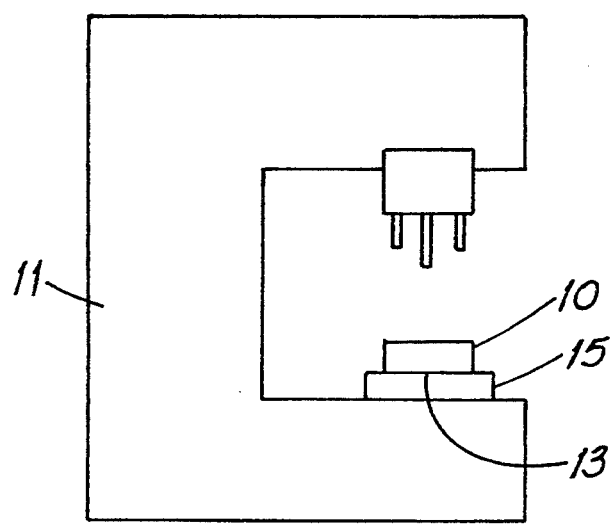
FIG. 2 is a representative side elevation view of a machine which may be a computerized numerically controlled (CNC) or a numerically controlled (NC) machine.

Before describing details of the new method, it will be helpful to have a general understanding of an exemplary "working environment" in which the method is used. To form a basis for explaining the method, it is assumed that the component 10 shown in FIG. 1 is to be machined using the machine 11 shown in FIG. 2. As noted above, such machine 11 may be of the NC or CNC type. It is also assumed that the finished component 10, shown in solid outline in FIG. 1, is to be made from a rough blank 12 shown in dashed outline in the same FIGURE. The blank 12 may be a casting, for example. Aspects of the method will now be described.

The component 10 is mounted at a location 13 on the machine 11 such as atop a bed 15 specifically provided to support such component 10. With a modern machine 11, the precise location at which the component 10 is placed is not particularly critical so long as the location 13 is within the larger area that can be "worked" by such machine 11.

Figure 1A:
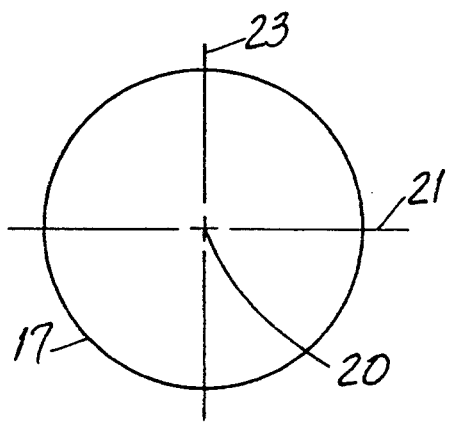
FIG. 1A is a top plan view, greatly enlarged, of a datum point shown in FIG. 1.

A pair of spaced datum points 17, 19, e.g., circular deformations or small diameter holes having a predetermined distance "D" therebetween, are provided on the component 10. (As shown in FIG. 1A, round datum points 17, 19 are preferred since they have a precisely-defined axis or center point.) The spacing of such datum points 17, 19 is selected in view of the general dimensions and shape of the component 10 to be machined. However, if the component 10 is somewhat elongate as shown in FIG. 1, accuracy will be improved if the points 17, 19 are as far apart as possible.

The spacing between "D" the datum points 17, 19 is programmed into the machine 11 in view of the general shape and size of the component 10 being machined. For example, if the casting 12 of FIG. 1 has a maximum dimension of, say, 15 inches, point spacing of about 14 inches would be satisfactory. In contrast, neither programming the machine 11 to place the points 17, 19, 2 inches apart nor programming it to place them 18 inches apart would be appropriate. In the former case, machining accuracy would suffer and in the latter, such spacing is not possible on the exemplary casting 12.

After placing the datum points 17, 19, a first base line 21 is defined and extends through such datum points 17, 19. In effect, the first base line 21 is programmably defined as a line between such points and is interpreted by the machine 11 as a reference line. A second base line 23 or 23a is then established to intersect the first base line 21 at a junction or intersection 25, 25a of such lines 23, 23a and 21. Preferably, the second base line 23, 23a is perpendicular to the first base line 21.

The solid-line base line 23a is at known distance(s) "Di", "D2" from the datum points 17 and 19, respectively. In the alternative, the dashed base line 23 extends through a datum point 17. While retaining the component 10 at the location 13, i.e., that location which the component 10 occupied when the locations of the datum points 17, 19 were "read" by the machine 11, such component 10 is machined using dimensions measured from the base line intersection 25 or 25a. For example, if the component 10 has a small notch 27 as illustrated, the machine 11 forms such notch 27 by moving its cutting head to the notch location indicated by the coordinates "X1" and "Y1".

To reiterate, the spacing of the datum points 17, 19 and the location of the intersection 25, 25a with respect to such datum points 17, 19 need be programmed in the machine 11 in view of only the general arrangement of the component 10 to be finish machined. The "setting" of the datum points 17, 19 on the component 10 (by, e.g., drilling the holes representing such points 17, 19) thereby establishes the relationship between (a) the component 10 and (b) the programmed machine coordinate system and the programmed final component dimensions based upon such coordinate system.

To put it another way, the machine 11 may be programmed with a pair of datum points 17, 19, with first and second intersecting base lines 21 and 23 or 23a and with component dimensions measured from the intersection 25 or 25a. When the component 10 is placed at the machine location 12 and the datum points 17, 19 provided in such component 10 using such machine 11, the machine 11 is thereby "referenced" to the component 10. So long as the component 10 is retained in the starting location 13, the machine 11 will perform finish machining to whatever extent it has been programmed to do so.

And it should also be appreciated that the component 10 can be removed from the machine 11 and, using the same datum points 17, 19, very accurately replaced. Further, such datum points 17, 19 can be used for inspecting and checking the accuracy of machining.

The rationale underlying other aspects of the new method will be more readily understood by first appreciating how gear teeth wear and how such wear occurs when a gear is loaded substantially more heavily in one direction of rotation than in another. One type of asymmetrical load is one which more heavily "loads" the gearing in one direction of rotation than in the other. A crane hoist is a good example of a drive which is more heavily loaded in one direction. In the hoisting direction, the load resists gear rotation while in the lowering direction, the load aids gear rotation. Another type of asymmetrical load is one which loads a few gear teeth more heavily that other teeth in the same gear. A walking dragline of the type shown in U.S. Pat. No. 5,279,173 (Blaszynski et al.) is an example of an application wherein certain teeth on a gear are worn more than others. Such patent is incorporated herein by reference.

Figure 4:
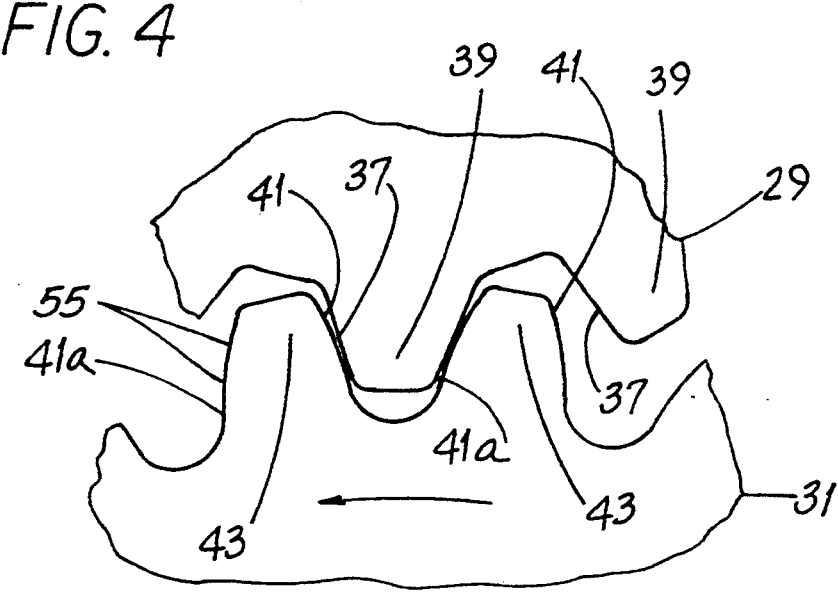
FIG. 4 is an enlarged view of engaging teeth of the gears of FIG. 3. Parts are broken away.
Figure 3:
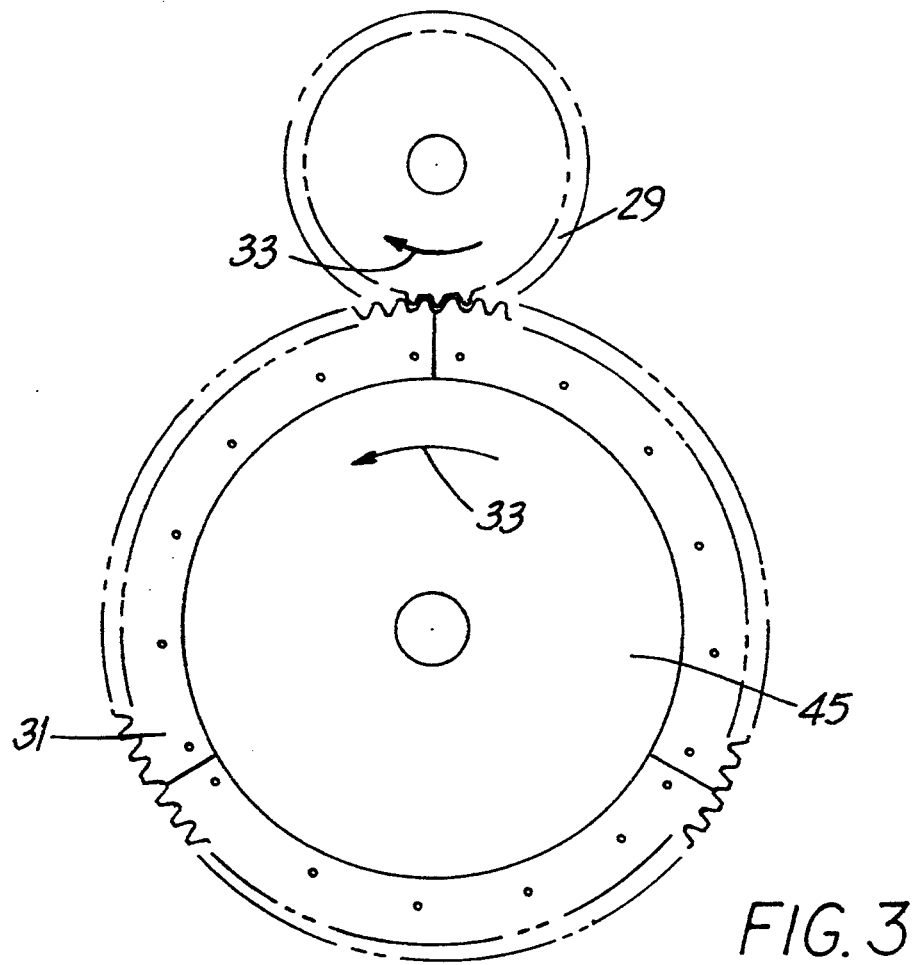
FIG. 3 is a representation of a pinion gear driving a segmented-type bull gear.

Referring to FIGS. 3 and 4, it is assumed the pinion gear 29 drives the bull gear 31, both turning in the directions of rotation as represented by the arrows 33. It is also assumed that gear rotation is unidirectional (i.e., the illustrated drive never reverses) or that the load imposed on the gears 29, 31 is asymmetrical.

Figure 5:
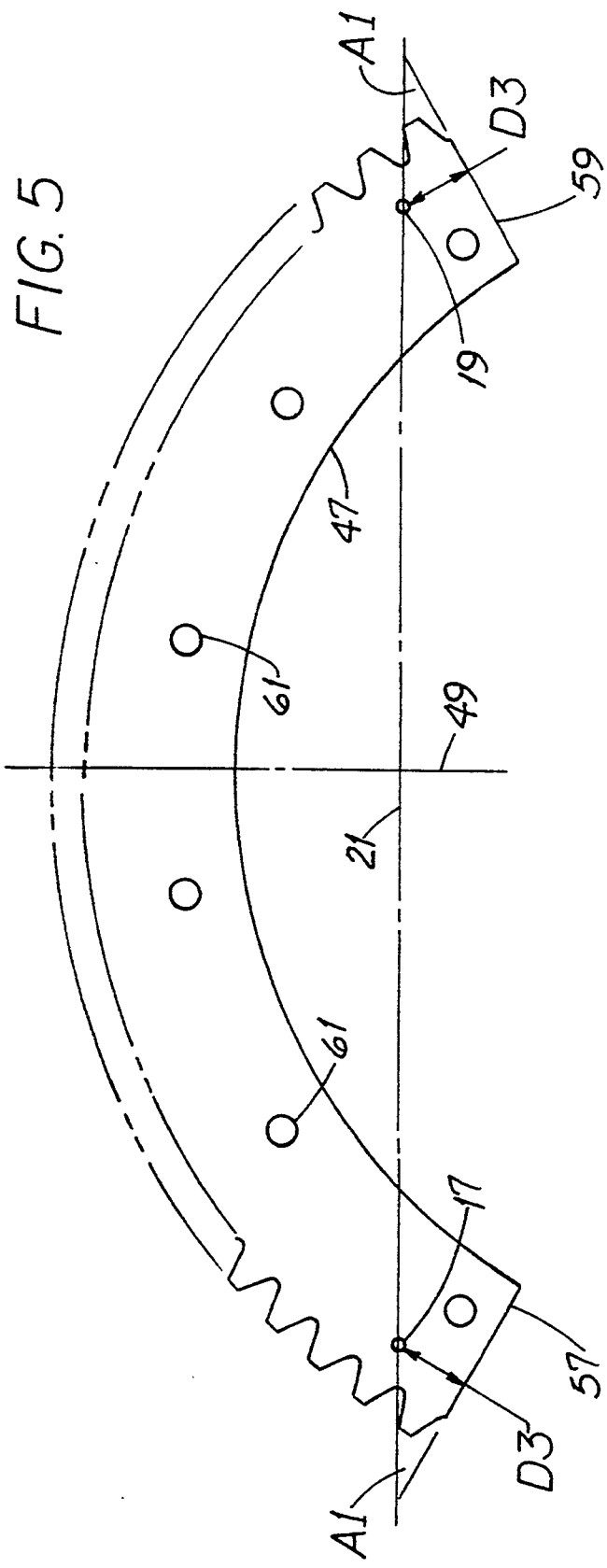
FIG. 5 is a view of one of the gear segments used on the bull gear of FIG. 3.

It is apparent from FIG. 4 that the surfaces 37 of the pinion gear teeth 39 and the surfaces 41 of the bull gear teeth 43 are those which are most heavily worn. And such gears 29, 31 may not be made as a single piece. The bull gear 31 shown in FIG. 3 is made with a central hub 45 with three arc-like gear segments 47 attached to it. One such segment 47 is shown in FIG. 5.

Since each segment 47 is removable from the hub 45 and since, in the example, one surface 41 of each segment tooth 43 is worn more rapidly than the other, it is desirable to be able to "flip" each segment 47 end-for-end. In that way, the surfaces 41a of the segment teeth 43 become those which are more heavily loaded. The useful working life and inherent value of each segment 47 will thereby be fully realized.

Considering further the exemplary arc-like gear segment 47, the machining step includes machining the segment 47 to be symmetrical about a plane 49 between the datum points 17, 19 and generally normal to the first base line 21. Most desirably, the plane 49 is exactly midway between such datum points 17, 19. Machining for such symmetry provides a gear segment 47 which may be "flipped" end-for-end.

Figure 6:
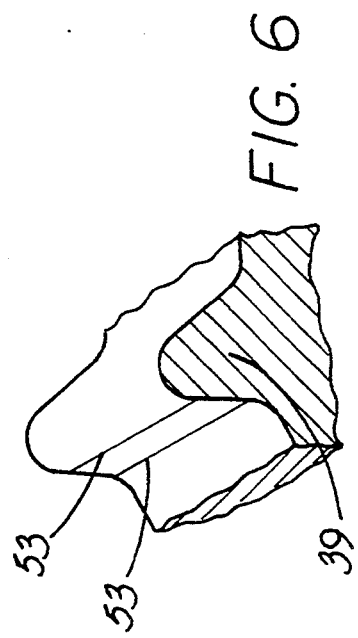
FIG. 6 is an isometric view of a gear tooth. Parts are broken away.

It is apparent from the foregoing and from an inspection of FIGS. 4 and 6 that for machining purposes, a surface (e.g., surface 37 or 41) of a gear tooth such as tooth 39 or 43 can be represented by a large number of straight lines 53 which, when viewed in FIG. 4, would appear as points 55. The location of each such point 55 with respect to the intersection 25, 25a of the base lines 21 and 23 or 23a (i.e., the "X" and "Y" coordinate location of such point 55) can be programmed into the machine 11. Therefore, surfaces 37, 41 of gear teeth 39, 43 and the notch 27 shown in FIG. 1 can be machined with precision.

Referring particularly to FIGS. 3 and 5, in another aspect of the method, the machining step includes machining a generally planar face 57 or 59 on each end of the gear segment 47. Each face 57, 59 is spaced from its adjacent datum point 17, 19, respectively, and where one or both of the datum points 17, 19 are holes as mentioned above, the center axis 20 of each datum point 17, 19 is spaced from its adjacent end 57, 59, respectively, by a dimension "D3". The machining step is carried out so that the end-to-hole dimensions "D3" are equal to one another and so that each face 57, 59 is at the same angle "A1" to a base line such as line 21.

In another aspect of the inventive method, the machining step may also include machining at least one aperture 61 in the segment 47. Such aperture(s) 61 may be later used to attach the segment 47 to the gear hub 45.

While the principles of the invention have been shown and described in connection with a few preferred embodiments, it is to be understood clearly that such embodiments are exemplary and are not intended to limit the scope of the invention.

WHAT IS CLAIMED:

1. A method for machining a component using a CNC or NC machine and including the steps of:
   mounting the component at a location on the machine;
   providing a pair of datum points on the component;
   defining a first base line extending through the datum points;
   defining a second base line intersecting the first base line at an intersection; and
   while retaining the component at the location, machining the component using dimensions measured from the base line intersection.

2. The method of claim 1 wherein:
   the component is generally elongate and has a pair of ends; and
   each datum point is adjacent to a separate end of the component.

3. The method of claim 2 wherein the machining step includes machining the component to be symmetrical about a plane between the datum points and generally normal to the first base line.

4. The method of claim 1 wherein:
   the mounting step includes mounting the component on a generally planar machine surface; and
   the machining step includes machining component surfaces which are generally normal to the machine surface.

5. The method of claim 1 wherein the component is an arc-like segment of a gear and:
   the machining step includes machining component surfaces comprising gear teeth on the segment.

6. The method of claim 5 wherein the machining step also includes machining at least one aperture in the segment.

7. The method of claim 1 wherein the component is an arc-like segment of a gear having a pair of ends and:
   the providing step includes machining a hole adjacent to each end;

the machining step includes machining a generally planar face on each end, and wherein each face is spaced from its adjacent hole by a dimension and: the machining step is carried out so that the dimensions are equal to one another.

8. The method of claim 1 wherein the providing step includes forming a pair of holes in the component.

9. The method of claim 1 wherein the providing step includes mounting a pair of dowel pins on the component.

10. The method of claim 1 wherein:
the second base line is perpendicular to the first base line;
the base line intersection is coincident with a datum point; and
at least one dimension is measured parallel to each base line.

* * * * *